United States Patent Office 2,715,776
Patented Aug. 23, 1955

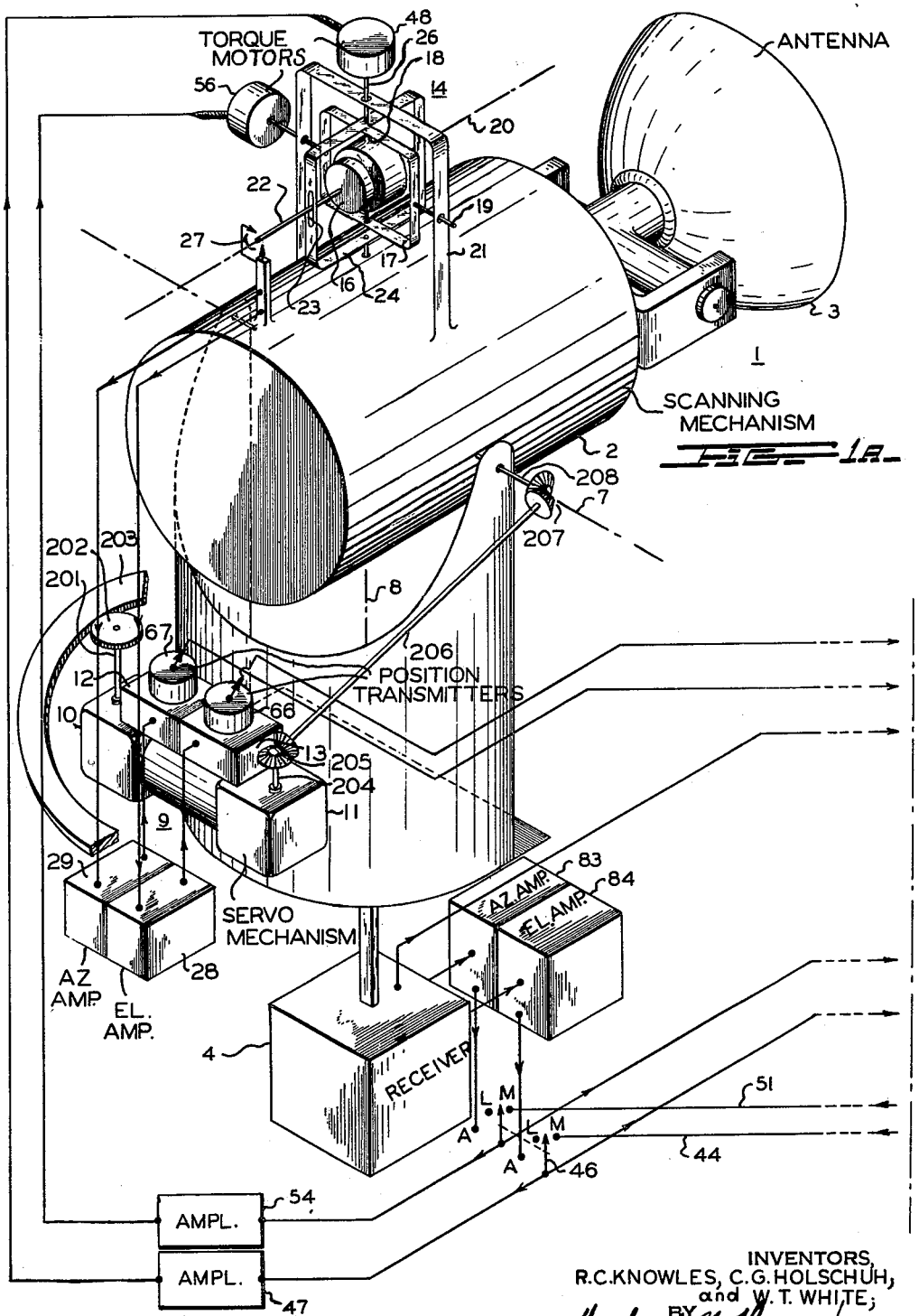

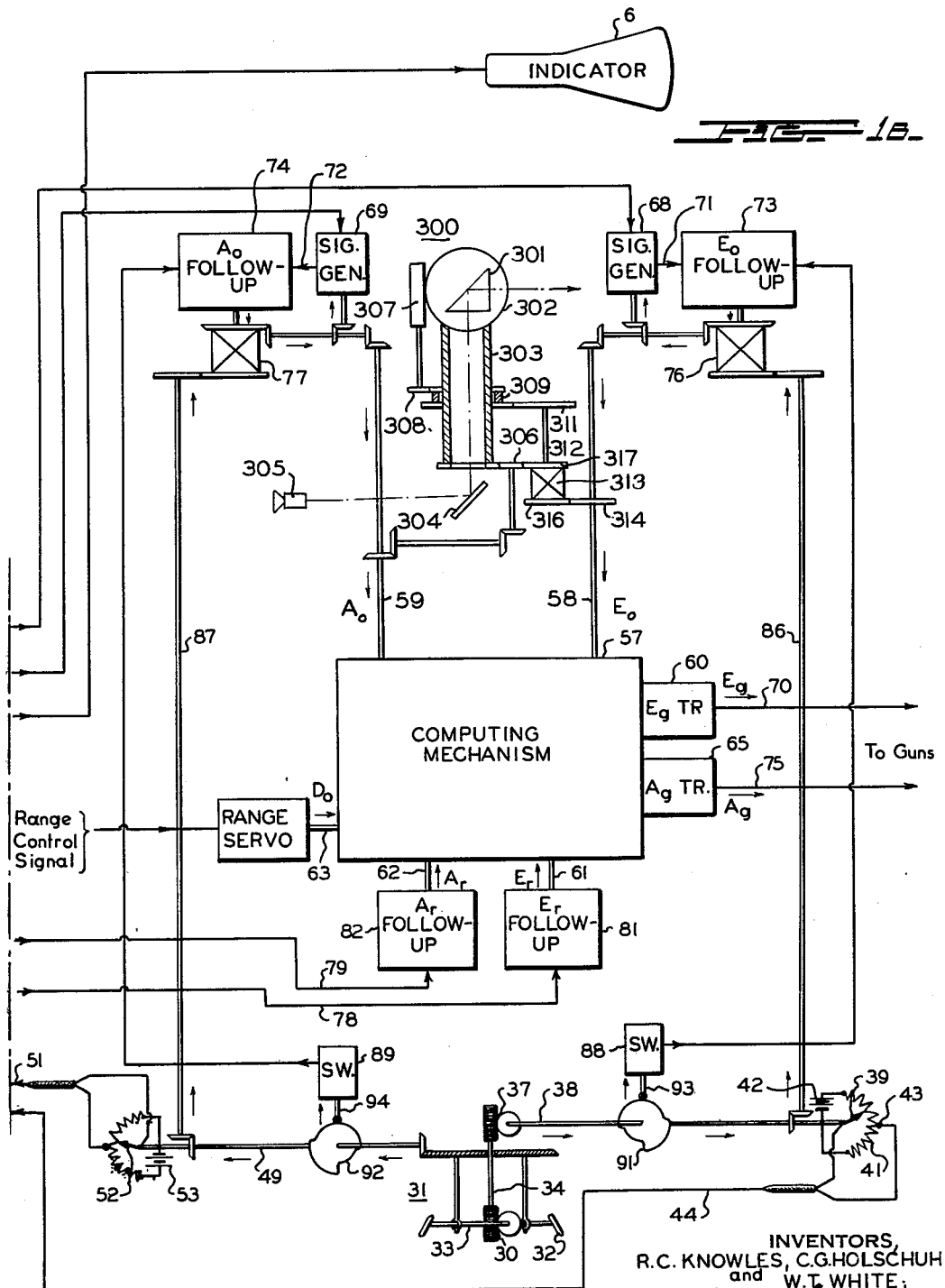

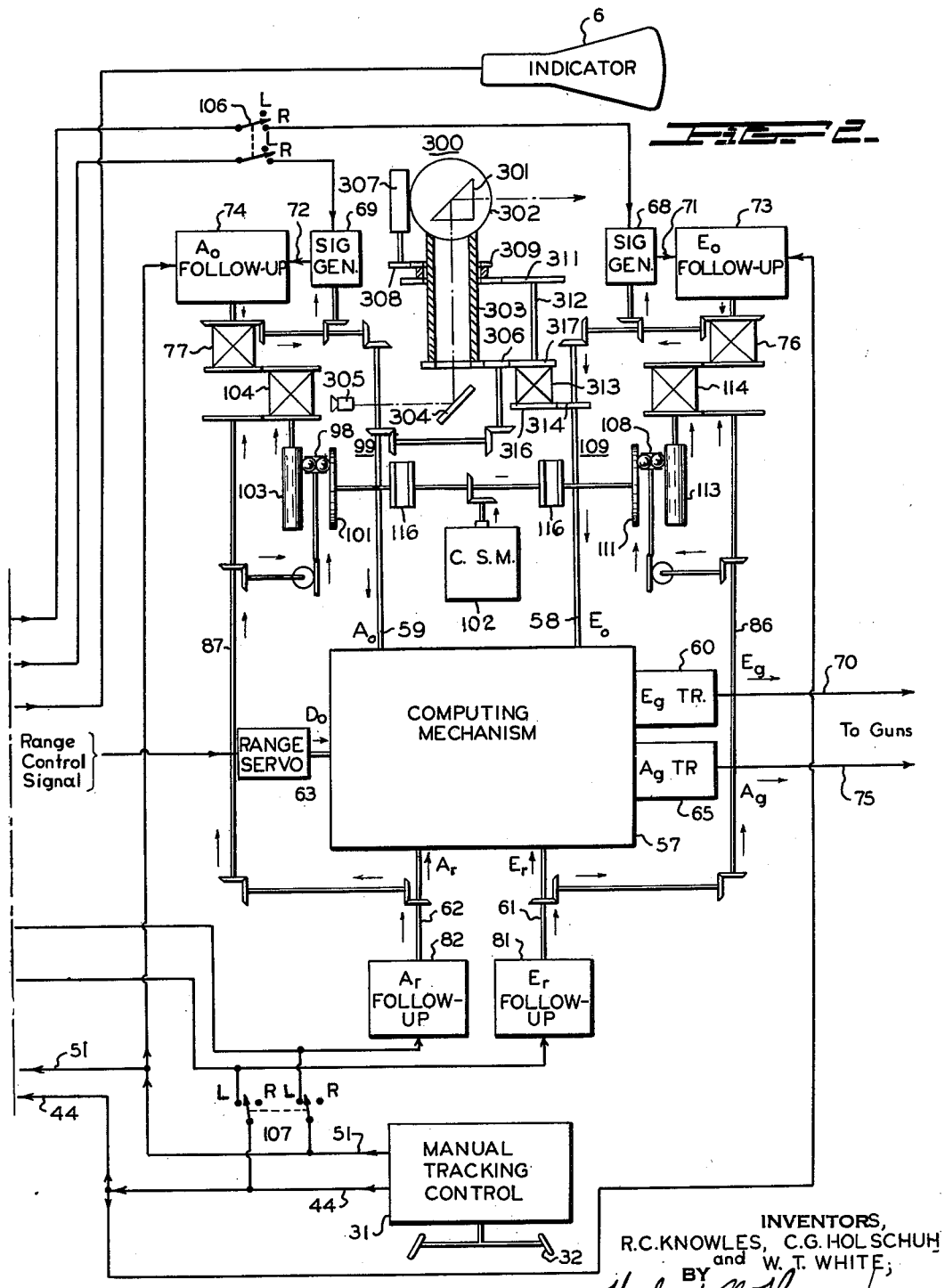

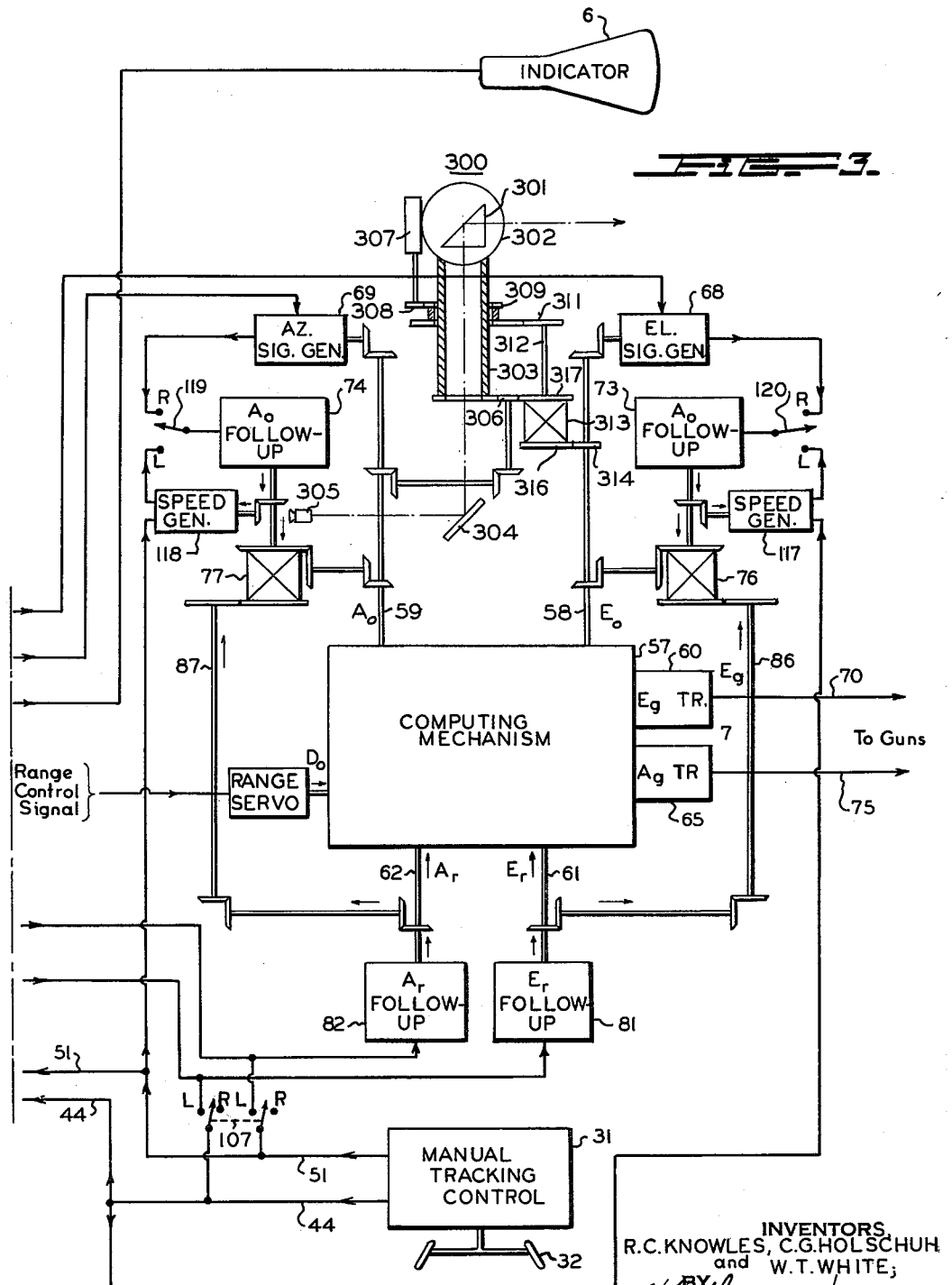

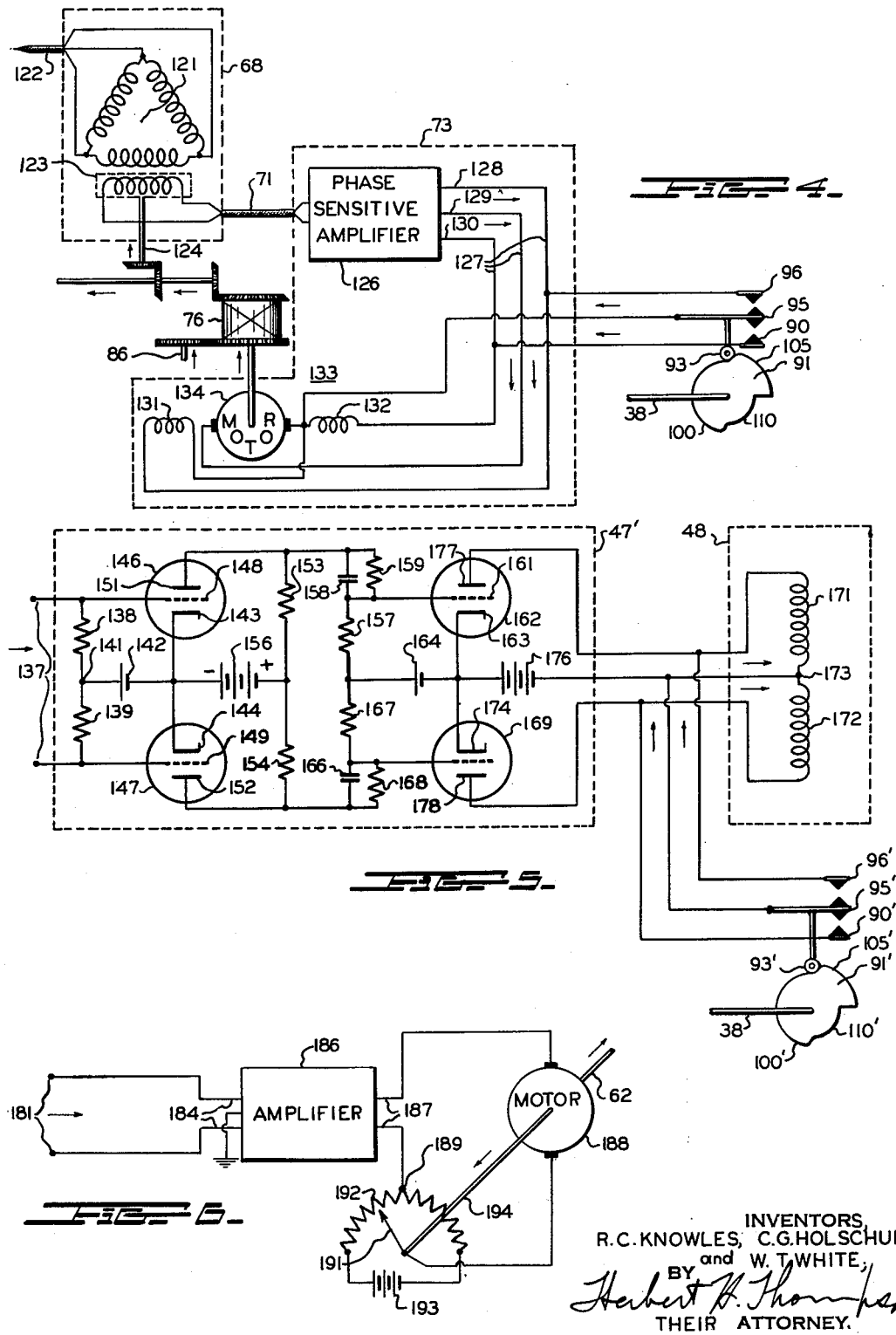

2,715,776

STABILIZED GUN CONTROL SYSTEM WITH AIDED TRACKING

Richard C. Knowles, New York, Carl G. Holschuh, Glen Head, and Walter T. White, Brooklyn, N. Y., assignors to Sperry Rand Corporation, a corporation of Delaware Application May 25, 1942, Serial No. 444,490

35 Claims. (Cl. 33—49)

The present invention relates to the art including fire control and tracking apparatus especially for unstable craft such as aircraft or ships. The present invention constitutes an improvement over the invention disclosed and claimed in copending application Serial No. 444,152, filed May 22, 1942, in the names of C. G. Holschuh, E. B. Hammond, Jr., and W. T. White, now Patent No. 2,660,793.

In this prior copending application there is disclosed and claimed a stabilized fire control and tracking system in which the spin axis of a free gyroscope is made to track with a target by means of torques applied to the gimbal axes thereof, which torques are proportional to the signals generated in a suitable manually- or radio-operated tracking control. The orientation of the spin axis of the gyroscope with respect to the target may be indicated during manual operation by means of an optical sighting device or a radio "sighting" device which is made to follow-up the orientation of the gyro spin axis. During automatic operation, the gyro axis automatically follows the target.

Data corresponding to the orientation of the target as determined from the orientation of the sighting device, and target rate data as determined from the signals controlling the precession of the gyro, are supplied to a suitable computing mechanism which derives therefrom, and from other data corresponding to the range of the target, the proper gun aiming angles for effectively firing at the target. These gun aiming angles are then used to indicate or control the proper orientation of suitable locally or remotely situated guns.

In the device of this prior application, the only type of manual control possible was of the rate type, in which a predetermined displacement of the manual tracking control member produces a corresponding and preferably proportional angular rate of change of the line of sight defined by the gyro spin axis and the radio or visual sighting apparatus.

It is desirable from the viewpoint of providing a more easily operated and more natural control to use "aided tracking," in which a predetermined displacement of the tracking control member produces both a corresponding and preferably proportional angular displacement of the line of sight and also a corresponding and preferably proportional angular rate of change of the line of sight. Such a tracking control has been determined to be much more useful than the pure rate type, since it enables the tracking operator to "get on" a target much more easily and naturally. Also, once "on" the target, he is enabled to follow the target more readily with aided tracking. For these reasons, the device of the above-mentioned prior application is modified by the present invention to include aided tracking. This is done in several different ways to be described more in detail hereinafter.

It is further more desirable to provide a means for rapidly changing or slewing the line of sight in order to quickly orient the line of sight toward a target when it is first observed. This also may be performed by the present invention.

Accordingly, it is an object of the present invention to provide improved stabilized fire control and tracking systems including aided tracking.

It is still another object of the present invention to provide an improved tracking system in which a line of sight defined by a free gyroscope may be tracked with a target with the use of aided tracking.

It is a further object of the present invention to provide improved fire control and tracking systems selectively operable with remotely or locally situated sighting devices, in which at least one of these sighting devices is operated by aided tracking.

It is another object of the present invention to provide improved fire control and tracking systems stabilized by the use of a free gyro which is made to track with a target, and in which aided tracking is employed for the control of this gyro.

It is a still further object of the present invention to provide improved fire control and tracking systems selectively operable with remotely or locally situated sighting devices stabilized by means of a free gyro which tracks with the target, at least one of these sighting devices being operated by aided tracking.

It is a further object of the present invention to provide improved fire control and tracking systems including improved means for slewing the line of sight of said system.

It is a still further object of the present invention to provide an improved fire control system selectively capable of stabilized operation with a local or a remote sighting device and also capable of unstabilized local operation.

It is yet another object of the present invention to provide an improved completely automatic radio-operated and stabilized fire control system.

Other objects and advantages of the present invention will become apparent from the following specification and drawings, wherein, Fig. 1A and 1B taken together show a schematic representation of one embodiment of the present invention.

Fig. 2 shows a modification of the portion of the system of Figs. 1A and 1B shown in Fig. 1B.

Fig. 3 shows a further modification of the portion of the system shown in Fig. 1B.

Fig. 4 shows a schematic representation of a position data follow-up mechanism and local sighting device slewing control useful in any of the preceding figures.

Fig. 5 shows a schematic diagram of a rate amplifier and slewing control for producing aided tracking and slewing of the gyro of any of Figs. 1–3.

Fig. 6 shows a schematic diagram of a rate data follow-up device useful with any of Figs. 1–3.

In these figures, the arrows on electrical cables and beside shafts indicate the direction of flow of control influences.

Referring to Figs. 1A and 1B, there is provided a remote sighting device 1 adapted to indicate the relative displacement between its orientation and that of a target. In the present instance this sighting device is illustrated as being a radio scanner 2 and indicating device 6 of the type shown and described more in detail in copending application Serial No. 441,188, filed April 30, 1942, in the name of C. G. Holschuh et al., now Patent No. 2,617,982. However, it is to be noted that, insofar as manual operation of the present system is concerned, any sighting device adapted to indicate the relative displacement between its orientation and that of a distant target may be used. Examples of such devices are telescopes, sound locators, searchlights, and many types of radiolocators.

As is described in this prior application Serial No. 441,188, scanner 2 comprises a directive antenna 3 whose directivity axis, during tracking operations, is continuously rotated in a very narrow cone about an axis defining the scanner orientation. A sequence of periodic short pulses of ultra-high-frequency radiant energy is continuously radiated from antenna 3. Portions of this energy reflected from a distant object or target within the field of the instrument are received in antenna arrangement 3 and are led to a suitable receiver 4. The output of receiver 4 then serves to actuate a suitable cathode ray indicator 6 to indicate the relative displacement or error between the scanner orientation and the target orientation.

Sighting device 2 is adapted to be positioned about a horizontal elevation axis 7 and a vertical azimuth axis 8, under the control of a suitable servo system indicated as comprising a conventional double-ended "Vickers" variable displacement hydraulic transmission unit or servo mechanism 9 having an azimuth control end 10 and an elevation control end 11 respectively actuating sighting device 2 about axes 7 and 8 in response to the signals input to their respective control boxes 12 and 13.

Azimuth control of sighting device 2 is effected by a shaft 201 that is rotated by the azimuth control 10 of the servo mechanism. The shaft 201 drives a pinion 202 that meshes with a stationary internal ring gear 203 whereby movement of the pinion causes rotation of the sighting device 2 about the vertical axis 8. Elevation control of the sighting device 2 is effected by a shaft 204 that is rotated by the elevation control end 11 and drives through gearing 205, shaft 206, and gearing 207 to rotate a shaft 208 and the sighting device 2 about the horizontal axis 7.

Control of sighting device servo 9 is obtained from a free gyro 14, comprising a rotor housing 16 gimballed within a ring 17 for rotation about a pivot axis 18 perpendicular to the spin axis 20 of gyro 14. Ring 17 itself is pivotally mounted for rotation about a horizontal axis 19 within a bracket 21 fixed to sighting device 2. An arm 22 is mounted on rotor housing 16 coaxial with the spin axis 20 of the gyro 14. Arm 22 passes through an opening 23 in a bail ring 24 which is pivotally mounted in bracket 21 about an axis 26 perpendicular to axis 19.

A pair of pick-offs, indicated schematically at 27, are provided for sensing relative deviation between the orientation of sighting device 2 and the orientation of the spin axis 20 of gyro 14, as determined by arm 22. Pick-offs 27 may be of any suitable type adapted to produce signals corresponding in magnitude and sense to the magnitude and sense of relative displacement between the orientation of sighting device 2 and the spin axis 20 of gyro 14 along any two independent coordinates, which are preferably taken to be elevation and slant plane azimuth. One suitable pick-off is that known as an "E" transformer in which movement of an armature relative to the transformer varies the flux in the legs of the transformer core and thereby produces a voltage of a sense and magnitude proportional to the direction and amount of displacement of the armature.

The signals produced in pick-offs 27 are used to control servo 9 through respective and suitable elevation and azimuth amplifiers 28 and 29 and control boxes 13 and 12. In this manner it is assured that the orientation of sighting device 2 remains in coincidence with the orientation of the spin axis 20 of gyro 14. It is to be noted, however, that strict coincidence is not necessary so long as motion of the axes of sighting device 2 and gyro 14 takes place in the same or parallel planes and with a fixed angle therebetween. Any desired servo or follow-up system may be used to maintain this relationship.

To track with the desired target, the orientation of spin axis 20 is manually or automatically controlled to maintain the orientation of sighting device 2 coincident with the target orientation, as indicated by indicator 6. This is done by means of the tracking control 31, shown as comprising a manually-operated handle bar control member 32 capable of independent adjustment about two mutually perpendicular axes 33 and 34 representing respectively adjustment in elevation and azimuth of the line of sight defined by sighting device.

Thus, manipulation of control member 32 about elevation axis 33 serves, through circular rack and pinion arrangements 30 and 37, to proportionally adjust a shaft 38 to which is coupled a variable arm 39 of a potentiometer 41, across whose outer terminals is connected a suitable source of voltage indicated schematically as a battery 42. While a direct voltage source 42 is shown in the drawings, it is to be understood that any suitable voltage, unidirectional or alternating, may be used. There is thus produced between variable arm 39 and center tap 43 of potentiometer 41, an elevation control voltage corresponding to the magnitude and sense of angular displacement of manual control member 32 about elevation axis 33. Preferably, the control voltage thus produced is made proportional to the displacement of control member 32, but this need not necessarily be the case. It may be desirable in some situations to provide a system wherein a given displacement of tracking control member 32 will produce a smaller change of the control voltage when near the neutral or zero signal point than when near the maximum signal point, whereby sensitive control is obtained for normal speeds of the target, and insensitive control for slewing.

The control voltage thus produced is led through a cable 44 and through switch 46, when in the right hand or "manual" position, to a suitable amplifier 47, and thence to a torque producing device or torque motor 48 connected to bail ring 24 and adapted to produce a torque on bail ring 24 about axis 26. Torque motor 48 may be of any suitable type adapted to produce an output torque corresponding in magnitude and sense to the magnitude and sense of the control voltage input thereto. Accordingly, a torque will be applied to ring 24 corresponding to the control voltage produced by tracking control 31. This torque is transmitted by ring 24 and opening 23 therein, to the shaft 22, and thereby to the rotor housing 16.

In accordance with the well known principles of gyroscopes, this torque results in a precession of gyro 14 about the perpendicular axis 19, and therefore produces a motion in elevation of the spin axis 20. This precession will take place at a rate proportional to the applied precessing torque and hence proportional to the control signal and to the displacement of manual control member 32, if a strict proportionality is observed throughout the system.

This precession of spin axis 20 will serve to produce a corresponding signal in pick-off 27, which thereupon controls servo 9 to reposition the axis of sighting device 2 into coincidence with spin axis 20, and thus the angular displacement of tracking control member 32 produces a corresponding rate of displacement in elevation of sighting device 2.

Rotation of control member 32 about axis 34 serves to rotate a shaft 49 and produces similar control voltages in cable 51 by means of a similar potentiometer and voltage source arrangement 52, 53. This azimuth control voltage is led through a second pole of switch 46 and an amplifier 54 to a similar torque-producing device 56 which impresses a torque upon ring 17 of gyro 14 about axis 19 thereof. This torque also produces a precession of spin axis 20, in this instance about axis 18. It will be observed that axis 18 is not maintained vertical but varies with the elevation of spin axis 20, and, accordingly, the resulting precession of spin axis 20 about axis 18 will be in the slant plane containing spin axis 20 and elevation axis 19.

Precession of gyro 14 about axis 18 also serves to actuate pick-off 27 and servo 9 so that sighting device 2 will follow the orientation of spin axis 20 in the same manner as described. Accordingly, it will be clear that rotation of manual tracking control member 32 about azimuth axis 34 produces a corresponding and preferably proportional angular rate of rotation of spin axis 20, in the slant plane. This may be termed "slant plane azimuth rate."

It will be clear that the line of sight of sighting device 2 is fully stabilized; that is, the only control required by the operator is to compensate for motion of the target with respect to the earth, since any random variation in the attitude of the craft carrying the system is ineffective to effect the line of sight, which depends solely on the orientation of gyro 14 and hence only on the displacement of manual tracking control member 32.

Also, by this system, the sighting device 2 may be remotely situated, only tracking control 31 and indicator 6 being at the operator's position.

The system thus far described provides an accurate, remotely controlled, and stabilized tracking system, as shown in the above-mentioned copending application Serial No. 444,152, and permits the accurate determination of the orientation and rate of change of orientation of a target.

For fire control purposes, a computing mechanism 57 is provided which produces the correct gun aiming angles for effectively aiming a gun to engage a target, from data corresponding to the present position and velocity of this target. This computing mechanism may be of the type shown in copending application, now abandoned, Serial No. 411,186 filed September 17, 1941, in the name of C. G. Holschuh and D. Fram modified to utilize slant plane azimuth rate data as discussed in Fig. 10B of copending application Serial No. 444,152. Thus, computing mechanism 57 is provided with a present target elevation data ($E_0$) input shaft 58, a present target azimuth data ($A_0$) input shaft 59, a present target elevation rate data ($E_r$) input shaft 61, a present target slant plane azimuth rate data ($A_r$) input shaft 62, and a present target slant range data ($D_0$) input shaft 63.

Present elevation and azimuth input shafts 58 and 59 are respectively actuated in accordance with the orientation of sighting device 2 by means of suitable follow-up systems. Elevation and azimuth position transmitters 66 and 67 are coupled to the elevation and azimuth axes of sighting device 2 through control boxes 11 and 12. These transmitters are of any suitable type and are supplied from a suitable source of energy (not shown in the drawings). The outputs of these transmitters are connected to elevation and azimuth signal generators 68 and 69 respectively which are coupled to the data input shafts 58 and 59 and adapted to produce in their outputs 71 and 72 respective signals corresponding to the relative displacement between their respective rotors. These voltages represent the difference between the actual orientation of sighting device 2 and the elevation and azimuth settings of computing mechanism 57. These signals are fed to respective elevation and azimuth follow-up devices 73 and 74 whose outputs serve to reposition position data input shafts 58 and 59 into coincidence with the orientation of sighting device 2, through respective differentials 76 and 77, whose function will be described more in detail below. In this way, the present target orientation data is supplied to computing mechanism 57.

It is to be noted that follow-up devices 73 and 74 may be of any suitable type adapted to cause continuous repositioning of shaft 58 or 59 so long as these shafts remain out of synchronism with the orientation of sighting device 2, as sensed by signal generators 68 and 69. One illustrative type of such follow-up is shown in Fig. 4. Thus, signal generator 68 is shown as an ordinary self-synchronous device, such as of the "Selsyn" type, comprising a polyphase-type winding 121 connected, as by cable 122, to position transmitter 66 coupled to the elevation axis 7 of scanner 2. Signal generator 68 also has a single-phase winding 123 inductively related to polyphase winding 121, and rotatable with respect thereto. As is well known, a reversible-phase, variable-magnitude alternating voltage corresponding in magnitude and phase to the magnitude and sense of relative displacement between its shaft 124 and the corresponding attitude of sighting device 2 will be produced in winding 123. This voltage is then connected, as by cable 71, to a phase-sensitive amplifier 126 adapted, in any well known manner, to provide in its push-pull output 127 differential uni-directional voltages appearing, respectively, between output conductors 128 and 129, and 129 and 130, and corresponding in magnitude and sense to the input voltage thereto. The output of amplifier 126 is connected to the opposed field windings 131, 132 of a series direct current motor 133, whose armature 134 is connected in the common leg 129 of push-pull output 127.

In this manner, when shaft 124 is in correspondence with the attitude of sighting device 2 in elevation, zero signal is produced in winding 123 and equal and opposite voltages are impressed across windings 131 and 132 of motor 133, whereby armature 134 remains at rest. Upon relative displacement between shaft 124 and sighting device 2 in a predetermined sense, one of windings 131 or 132, such as, for example, winding 131, will receive increased current and the other winding, such as winding 132, will receive decreased current, thereby providing a resultant field for motor 133 and causing rotation of armature 134 in a corresponding sense, so as to reposition differential 76 and shaft 124 into correspondence with sighting device 2. Upon relative displacement in the opposite sense, the resultant field of motor 133 will be reversed, as by increased current supplied to winding 132, causing opposite rotation of armature 134, again in a sense to restore the system to correspondence. It will be clear that similar apparatus may be used for the azimuth control of computing mechanism 57.

It is to be understood that the follow-up system described in Fig. 4 is illustrative only and any other follow-up system suitable for producing the results and functions indicated may be used.

As described above, the rate of change of the orientation of the sighting device 2 and spin axis 20 of gyro 14, at least in elevation and slant plane azimuth components, corresponds to the signal voltages appearing in cables 44 and 51. Accordingly, these voltages may be used to control the rate data input shafts 61 and 62 of computing mechanism 57. Thus, cables 44 and 51 are connected respectively to the input cables 78 and 79 of respective elevation and azimuth rate follow-up devices 81 and 82, which may be of any suitable type adapted to produce a displacement of their output shafts coupled directly to respective rate data input shafts 61 and 62, proportional to the signal voltages input thereto. One type of follow-up device 81, 82 is shown in Fig. 6.

Thus, referring to Fig. 6, there is shown one form of rate follow-up device suitable for use as azimuth or elevation rate follow-up 82 or 81. Input terminals 181 are supplied with a signal which represents the instantaneous angular rate of the line of sight. This signal may be obtained by connecting terminals 181 directly across torque motors 48, 56 whereby this signal then represents the actual voltage impressed across the torque motor 48 or 56, or may be the input to rate follow-up devices 81, 82 as in Figs. 1A and 1B. As described, the angular rate of change of the orientation of the gyro spin axis 20 or of the orientation of sighting device 2 is directly proportional to this signal. Therefore, there will be impressed across the input terminals 184 of amplifier 186 a reversible polarity voltage representing the instantaneous rate of change of the gyro spin axis orientation.

Assuming that amplifier 186 is an ordinary linear amplifier, adapted merely to increase the magnitude of its input voltage, there will then be produced across output terminals 187 thereof a corresponding amplified voltage. This voltage is impressed across the armature terminals of a suitable motor 188 which may be of any direct current type. The impressed voltage is in series with the voltage obtained between the center-tap 189 and variable arm 191 of a potentiometer 192 across whose outer terminals is impressed a source of constant voltage 193. The field of motor 188 is supplied from a constant source that is not shown in the drawings. Motor 188 is adapted to continue rotating so long as the voltage across its terminals is not zero, and in a direction to reduce this voltage to zero. When this relation exists, it will be clear that the voltage across output terminals 187 will be equal and opposite to the voltage between tap 189 and variable arm 191. In this way, motor 188 and its associated apparatus are adapted to convert a variable magnitude reversible polarity unidirectional voltage into an angular displacement of shaft 194 of motor 188, corresponding both in magnitude and sense to this voltage.

It will be clear that the present invention need not be restricted to unidirectional voltages but that alternating voltages could also be used, in which case the output of amplifier 186 would be alternating in character, battery 193 would be replaced by a source of alternating voltage, and motor 188 would be responsive to the difference between these alternating voltages.

Also, the present device need not be restricted to the use of an electric motor, such as 188. Any servo device responsive to the net voltage produced by output 187 and potentiometer 192 and effective to reposition potentiometer 192 to balance out the voltage of output 187 may be used.

Shaft 194 is directly connected to its corresponding rate data input shaft 62 or 61, and accordingly positions this rate data shaft in accordance with and preferably proportional to the voltage derived from terminals 187. The rate data follow-up device just described may also be used in any of the following figures.

In this manner, the present target rate data required by computing mechanism 57 is determined and set in. The actuation of slant range data input shaft 63 may be performed in any suitable manner, such as shown in the above-mentioned copending applications Serial Nos. 444,152, 441,188, or 411,186.

In response to the various data thus set into computing mechanism 57, this computing mechanism determines the proper gun aiming angles for effectively engaging with the target whose data is thus set in. This computing mechanism is preferably of the type shown and described more in detail in the above-mentioned copending applications Serial Nos. 444,152 and 411,186. As is therein shown, respective gun elevation and gun azimuth self-synchronous position transmitters 60 and 65 are thereby positioned in accordance with the elevation and azimuth components of these correct gun aiming angles and serve to produce in their output cables 70 and 75 electrical signals corresponding to these angles. These signals then serve to indicate or control the orientation of suitable guns or gun turrets in a manner, for example, described in copending application Serial No. 424,612, filed December 27, 1941, in the name of E. L. Dawson et al., now Patent No. 2,445,765.

In this way, there is provided a complete and unified stabilized fire control system whose operation during manual radio tracking operations is as follows: The operator or gunner will operate the manual tracking control member 32 to maintain the orientation of sighting device 2 in track with the target as indicated by indicator 6. This is done by the generation of proper control signals in potentiometers 41 and 52, which signals control the precession of the spin axis 20 of the gyro at a rate and in a direction corresponding to these signals, in the manner already described. Sighting device 2 is made to follow the orientation of spin axis 20 by means of servo 9, and the orientation of sighting device 2 sets the orientation data inputs 58 and 59 of the computing mechanism 57 in accordance with the present target orientation. Target rate data is simultaneously set into the computing mechanism 57 under the control of the same control signals operating through the rate follow-ups 81 and 82. Simultaneously the gunner will set in the proper range data into input shaft 63 in any suitable manner. By so doing, the guns are correctly oriented and may effectively fire at the target.

It is to be noted that in this system the operations required of the gunner are exactly the same as in prior system, such as exemplified by copending application Serial No. 411,186, so that the present system has the distinct advantage of providing improved and stabilized remote operation, without requiring any additional training for the gunner, who performs his control operations in exactly the same natural manner as in prior systems.

The system thus far described may also be used with a local and preferably visual sighting device 300. If desired, such a local sighting device may be operated in the same manner as the remote sighting device described above. Preferably, however, the orientation of such a local sighting device is controlled directly in elevation and azimuth from the data input shafts 58 and 59 of computing mechanism 57.

The sighting device 300 includes a reflecting prism 301 rotatably adjustable about a horizontal axis (in elevation) by a worm gear 302. This worm gear 302 and prism 301 are carried by a main body 303 that is mounted for rotation in azimuth about a vertical axis. The line of sight is reflected by prism 301 to a reflector 304, which reflects it into an eye-piece 305, whereby a target in the line of sight may be observed and tracked by the operator.

Azimuth shaft 59 drives through suitable gearing to rotate a pinion 306 that rotates the main body 303 about a vertical axis and thus adjusts a line of sight in azimuth. The shaft 59, representing the azimuth position of the line of sight, is also used to drive present azimuth ($A_0$) of a target into the computer. Rotation of the worm gear 302 to adjust the elevation of the line of sight is effected by a worm 307 that is driven by a gear 308 meshing with a ring gear 309 which surrounds the main body 303 and is free to rotate relative thereto. The ring gear is driven by pinion 311 on a shaft 312 that is in turn driven by the output of a compensating differential 313. The shafts 58 and 59 act through pinions 314 and 305, respectively, to drive gears 316 and 317 representing the input to the differential 313. The purpose of the differential is to prevent changes in azimuth from affecting changes in elevation of the line of sight by rotating ring gear 309 with the main body for changes in azimuth.

From the description, it will be apparent that the shafts 58 and 59 control the elevation and azimuth position of the line of sight extending from sighting device 300. For a more complete description of the sight and computing mechanism reference may be had to the above mentioned copending application Serial No. 411,186, filed September 6, 1941.

In using this local sighting device 300, switch 46 remains in its manual position M. Manual tracking control 31 is actuated in the same manner as described above, to control gyro 14 which in turn controls remote sighting device 2 and thereby actuates data input shafts 58 and 59 and positions the local sighting device coupled thereto to maintain its orientation in track with the target. In effect, therefore, the local sighting device merely replaces indicator 6 and the functioning of the system remains unchanged. Hence, the mode of operation, insofar as the gunner is concerned, remains unchanged. It is to be noted that the local sighting device 300 may also be radio, visual, acoustic, infra-red, etc. in character.

If automatic operation is desired the remote sighting device is preferably a radio-operated scanner. Switches 46 are thrown to their automatic position A, in which case the output of radio receiver 4, passing through respective azimuth and elevation amplifiers 83 and 84 and corresponding to the deviation between the scanner orientation and target orientation, serves to actuate gyro 14 to return the spin axis of gyro 14, and hence the orientation of scanner 2, into coincidence with the target orientation.

In this way, scanner 2 automatically tracks with the target and the orientation of scanner 2, being thus the same as the target orientation, serves to set the proper position data into computing mechanism 57 by way of data input shafts 58 and 59.

It is also to be observed that the voltages applied to torque motors 48 and 56, in order to maintain scanner 2 in track with the target, must represent the rates of rotation in elevation and azimuth of the scanner orientation and hence of the target orientation. Accordingly, these voltages may be utilized in the same manner as during manual remote tracking to control the elevation and azimuth rate follow-ups 81 and 82, and thereby set the required rate data into computing mechanism 57 by way of rate data inputs 61 and 62.

As shown and described in U. S. application 441,188, hereinabove referred to, it will be understood that, for automatic tracking purposes, the nod motion of the scanner is stopped and the scanner is so positioned relative to its support that the directional axis of the radiation beam pattern is slightly displaced at a small fixed angle from the spin axis about which the scanner or radiation pattern is rotated. This displacement of the directional axis of the beam pattern with respect to the spin axis may be accomplished electrically, or mechanically in the manner above indicated. When the axes are arranged in this manner, what is termed conical scanning is achieved. That is to say, energy of constant intensity is radiated or received along an axis coincident with the spin axis, while along the displaced directional axis of the radiation pattern, maximum radiation and maximum receptivity is encountered only once during each spin cycle, resulting in a spin frequency modulation of waves received by reflection from an object oriented along the directivity axis of the wave pattern.

The waves so received by reflection from the object or target are passed to a receiver and the output of the receiver is connected to azimuth and elevation servo amplifiers. The signal voltage supplied to the respective amplifiers should be a measure of the error either in azimuth or elevation. Since the displacement error output of the receiver is the resultant of the errors measured in azimuth and elevation of the spin axis of the scanner from the direction to the target, it is necessary to resolve the error signal received by the scanner into its azimuth and elevation components. This may be accomplished, for example, by the devices described in the following.

A two-phase transmitter is arranged so that its rotor rotates synchronously with the scanner in spin. The field of the transmitter is of a two-phase type and the rotor comprises a single-phase energizing winding. For tracking purposes, the exciting winding of the transmitter is connected with a suitable source of alternating current and the voltages produced by the 90° spaced coils of the two-phase field windings will be 90° out of phase whereby to provide reference voltages for determining the values of the components of the error signal in elevation and in azimuth.

For example, these voltages may be respectively applied to the deflecting plates of a cathode ray tube while the electron beam is modulated in intensity by the error signal derived from the receiver. In this manner, a visual indication of the error may be obtained.

It should be clear that the instantaneous maximum of the spin frequency modulation will occur at the instant the directional axis of the beam pattern lies closest to the direction of the target. Hence, the phase of this modulation bears a certain relation to the spinning of the scanner, and this phase relationship may be employed in determining the relative position of the spin axis of the scanner with respect to the direction of the target. Accordingly, the angular displacement between the direction of the spin axis and the direction of the target may be determined by comparing the phase of the modulation with the spin cycle of the scanner, and the elevation and azimuth components of this displacement may be obtained by comparing the initial error signal with the two voltages derived from the transmitter above described.

Phase-sensitive amplifiers function in effect to compare the phase of the signal voltage with respect to the phase of the spin of the scanner, and thereby serve to resolve the error signal into its elevation and azimuth components. For example, the output of the receiver is a voltage varying periodically in amplitude at the spin frequency. This voltage may be passed through a filter adapted to pass waves only of the spin frequency and thence to the phase-sensitive amplifiers. One of the voltages from the spin transmitter may be considered as the elevation reference voltage and the other as the azimuth reference voltage since they are 90° out of phase. Hence, one of these voltages is applied to one of the elevation or azimuth servo amplifiers, both of which include a phase-sensitive circuit, and the other is supplied to the other thereof. These voltages or the modulation components thereof may be applied to the plates of the tubes of the phase-sensitive amplifiers while the output of the receiver, or the initial error voltage, may be applied to the grids thereof. As is well known, a circuit of this character may function to provide a voltage output (for example, a D. C. voltage output) the magnitude of which is dependent upon the amplitude and phase relationship of the signal voltage with respect to the phase of the spin of the scanner. In this way, the error voltage output of the respective amplifiers is proportional to the error between the spin axis of the scanner and the direction of the target measured along the elevation and azimuth axes.

Under automatic tracking conditions, the outputs of the elevation and azimuth servo amplifiers cause the servos to move the scanner in such a direction as to tend to reduce the error and error signal to zero and, therefore, the scanner will automatically follow and track with a chosen target.

Range data may also be automatically set into computing mechanism 57 by controlling range data input shaft 63 from receiver 4 in the manner described in copending application Serial No. 441,188.

The system thus far described is exactly the same as that shown in Figs. 10A and 10B of copending application Serial No. 444,152 and as claimed in that application. In addition to the above types of operation, however, the system of Figs. 1A and 1B provides an aided tracking control of computing mechanism 57 during local tracking operations using the local sighting device 300. For this purpose the angular displacements of respective elevation and azimuth shafts 38 and 49 of manual tracking control 31 are connected to the third members of differentials 76 and 77, described above, by way of shafts 86 and 87, and are therein added to the angular displacements produced by follow-up devices 73 and 74.

As was seen above, the angular displacements of shafts 38 and 49 are respectively proportional to the elevation and azimuth rates of data input shafts 58 and 59 and hence of the orientation of the local sighting device. Also as described above, the rates of rotation of the outputs of elevation and azimuth follow-ups 73 and 74 are proportional to the respective component angular displacements of control member 32. Accordingly, the combination of these two effects obtained in the outputs of differentials 76 and 77, to which are directly connected the data input shafts 58 and 59, represents aided tracking during local tracking operations.

It is to be noted that these mechanical links 86 and 87 between manual tracking control 31 and the data input shafts 58 and 59 of computing mechanism 57 have no effect upon the operation of the system during remote tracking operations, using remote sighting device 2, since the already described criterion during such remote operations is that shafts 58 and 59 shall remain in synchronism with the orientation of remote sighting device 2. Any effect which shafts 86 and 87 might tend to have upon the setting of data input shafts 58 and 59 is immediately balanced out by corresponding and opposite operation of the follow-ups 73 and 74 in response to the action of signal generators 68 and 69.

However, during remote manual tracking operations, the mechanical connections 86, 87 do offer the advantage that they overcome any lag which might take place in the cascaded operations of torque motors 48, 56, gyro 14, pick-offs 27, servo 9, and follow-up devices 73, 74, since connections 86, 87 serve to advance shafts 58, 59 to reduce the signals produced in signal generators 68, 69 even before these signals can operate the follow-up devices 73, 74. In a sense, therefore, connections 86, 87 anticipate the required changes in setting of data inputs 58, 59, and cause these changes to be made with less lag and hence improve the accuracy of the system.

Accordingly, the present invention has added aided tracking during local tracking operations and improved following to the system shown and described in copending application Serial No. 444,152.

In addition, it is desirable to provide a slewing control for such systems whereby extremely high angular rates of change of the setting of computing mechanism 57 may be obtained when desired, as during situations when the target is first observed and it is necessary to begin tracking therewith, or when the target flies past directly overhead which is the moment of greatest angular rate and may exceed the normal ability of the system to track therewith.

Such a slewing control may be provided, at least during local operations, by means of respective cams 91 and 92 actuated by elevation and azimuth control shafts 38 and 49 of tracking control 31. These cams 91 and 92 and their followers 93 and 94 are so designed that upon actuation of tracking control 31 to its maximum displacement in either direction, in elevation or azimuth, corresponding cam 91 or 92 will operate to drive the corresponding follow-up 73 or 74 and the position data input shaft 58 or 59 and the local sighting device at maximum speed in a corresponding direction so long as control member 32 is held to its maximum displacement.

One type of such slewing control, useful with the follow-up described in Fig. 4, is also illustrated in Fig. 4. Thus, cam 91 is provided with a follower 93 which actuates a movable contact 95 cooperating with a pair of opposed fixed contacts 96 and 90. During normal operation of tracking control member 32, follower 93 will ride upon the intermediate radius 100 of cam 91 and, in so doing, contact 95 remains disengaged from both contacts 90 and 96, whereby cam 91 has no effect upon the follow-up circuit. Upon reaching the extreme limit of displacement of tracking control member 32 in one sense, which is the condition illustrated in Fig. 4, cam follower 93 will then ride up upon a larger radius portion 105 of cam 91 and will thereby close contacts 95 and 96. This short-circuits one winding, such as winding 131, of motor 133 and thereby produces a maximum unbalance between windings 131 and 132 and a resulting maximum speed of rotation of motor 134, which thereby slews the corresponding data input shaft and the local sighting device 300 at a rate preferably chosen to be several times the maximum rate obtained during normal operation.

Upon actuation of tracking control member 32 to its opposite extreme, cam follower 93 then rides upon a reduced radius portion 110 of cam 91 and thereby closes contacts 90 and 95, short-circuiting the other winding 132 of motor 133 and providing maximum slewing rate of motor 133 in the opposite direction.

It will be clear that such slewing control may be provided for each independent axis of motion of the system.

If desired, additional contacts could be added also operated by cam 91, so as to reverse instead of short-circuiting respective field windings, whereby its effect is added to that of the other winding to produce double speed output, instead of removing its effect as is the case in Fig. 4.

It should be understood that other types of slewing control may also be used. Thus, an independent motor under the control of cam 91 may be employed, ineffective during normal tracking and used only during slewing. Also, other types of follow-up devices may be employed, such as hydraulic, pneumatic, etc. in place of the one shown in Fig. 4.

As described above, the system of Figs. 1A and 1B utilizes gyro 14 and sighting device 2 even during visual tracking. In order to provide for the contingency that either gyro 14 or remote sighting device 2 may be disabled, it is desirable to render the visual tracking independent of any operations of the gyro 14 or the scanner 2. Such a system is provided in Fig. 2, which cooperates with Fig. 1A to form a complete system. In this figure, referring for the moment to the azimuth control, which is identical with the elevation control, shaft 87, instead of being actuated directly and mechanically from tracking control member 32, is actuated from the output 62 of the azimuth rate follow-up 82.

It will be clear that, since azimuth rate follow-up 82, at least during manual operations, produces an output angular displacement of its output shaft 62 proportional to the displacement of control member 32, it is immaterial whether shaft 87 is actuated directly from control member 32, as in Fig. 1B, or from output shaft 62 of follow-up 82, as shown in Fig. 2. Either type of operation could be used in either of Figs. 1B or 2.

Shaft 87 also controls the ball carriage 98 of a suitable conventional variable speed drive 99 whose driving disc 101 is driven at constant speed from a constant speed motor 102, thereby producing rotation of driven cylinder 103 at a rate proportional to the setting of ball carriage 98 and hence, proportional to the angular displacement of shaft 87 and control 32. The motions of shaft 87 and cylinder 103 are combined in a differential 104 whose output is led to the input of differential 77 already described in Fig. 1B.

In the system of Fig. 2, during local tracking operations, the inputs to azimuth signal generator 69 and elevation signal generator 68 are preferably interrupted by a suitable switch 106, which is thrown to its L or "local" position, whereby the output shafts of the corresponding follow-ups 73 and 74 are immobilized. Preferably, also, during local tracking, switch 46 of Fig. 1A is moved to its center or open circuit position L, whereby torque motors 48 and 56 controlling gyro 14 remain unenergized. Therefore, the gyro spin axis 20 and the sighting device 2 remain uncontrolled and have no effect on the system.

The rate signals output from potentiometers 43 and 52 of tracking control 31 are now led directly to the corresponding rate follow-ups 81 and 82 by way of a suitable switch 107, also thrown to its "local" position L. Accordingly, displacement of control member 32, for example, in azimuth, will produce a corresponding azimuth rate signal by means of potentiometer 52, which signal is fed to azimuth rate follow-up 82 and correspondingly positions shaft 62 of this follow-up. Shaft 62 sets in the proper slant plane azimuth rate into the computing mechanism 57 and also proportionally positions shaft 87. The positioning of shaft 87 displaces ball carriage 98 of variable speed drive 99 and produces in the output of differential 104 a type of aided tracking motion which is led through differential 77 to the azimuth data input shaft 59 to control both computing mechanism 57 and the local sighting device. It will be clear that the elevation control is identical with that just described. The system, therefore, operates during local tracking in substantially the same manner as disclosed in the above mentioned copending application Serial No. 411,186, the stabilization of the line of sight having been eliminated.

If it is desired that stabilization of the line of sight be retained during local tracking, switches 106 and 107 will be thrown to the "remote" position R, and switch 46 will be thrown to the manual position M, thereupon displacement of tracking control member 32 produces a corresponding angular velocity of the spin axis 20 of gyro 14. Remote sighting device 2 follows spin axis 20, and by means of follow-ups 73 and 74 and signal generators 68 and 69, serves to maintain the data input shafts 58, 59 and the local sight in synchronism with the spin axis 20 of gyro 14.

The operator will still actuate tracking control member 32 to maintain the local sight in a tracking relation with the target. The action of variable speed drives 99 and 109 does not effect the stabilization of the line of sight, since any discrepancy between the actual line of sight of the local sighting device and the desired stabilized line of sight defined by the gyro spin axis orientation is immediately corrected by signal generators 69, 68 and follow-ups 74, 73 which maintain this line of sight in synchronism with the gyro spin axis, and hence fully stabilized. The only effect of the variable speed drives 99 and 109 is to reduce the amount of control necessary to be derived from follow-ups 74, 73 in order to maintain the desired stabilized relation. In effect, variable speed drives 99 and 109 replace follow-ups 74, 73, which are relegated merely to a corrective relation in the system.

If desired, variable speed drives 99, 109 may be rendered ineffective during stabilized local tracking as by means of suitable clutches 116 or by disenergizing motor 102, in which case the operation of the system becomes exactly similar to that of Fig. 1B.

During manual remote tracking, switches 46, 106 and 107 are positioned as during manual stabilized local tracking; that is, switch 46 is positioned to its manual position M and switches 106 and 107 are positioned to their remote positions R. Operations in this system are then carried out in the same manner as described with respect to Fig. 1B, whereby the operator actuates manual tracking control member 32 to maintain spin axis 20 of gyro 14 and the orientation of remote sighting device 2 directed toward the target, as evidenced by the indications observed on indicator 6. By so doing, the present position data input shafts 58 and 59 of computing mechanism 57 are actuated respectively in accordance with the present elevation and azimuth of the target, since follow-ups 73 and 74 and signal generators 68 and 69, in cooperation with position transmitters 66 and 67, serve to maintain shafts 58 and 59 in synchronism with the orientation of remote sighting device 2 and hence with the target orientation during proper tracking. The rate data required by computing mechanism 57 is derived from the respective azimuth and elevation control signals produced by tracking control 31 and from the azimuth and elevation rate follow-ups 82 and 81, as described above.

Shafts 86 and 87 and variable speed drives 109 and 99 will serve to roughly position shafts 58 and 59 as desired during manual remote tracking since functioning of the system will be substantially the same as during local stabilized tracking. However, any discrepancies between the control produced by the outputs of differentials 104, 114 with respect to the desired settings of shafts 58, 59, as determined by the orientation of remote sighting device 2, will be sensed by the signal generators 68, 69 which will serve to actuate follow-ups 73, 74 therefore, instead of supplying the full motion or displacement of shafts 58, 59, as in Fig. 1B, now merely serve to supply a corrective effect.

This has a distinct advantage, since the control of shafts 58, 59 introduced by shafts 86, 87 and variable speed drives 109, 99 takes place almost instantaneously in response to actuation of tracking control 31, the only possible lag which might be introduced into the system being that of azimuth and elevation rate follow-ups 82, 81. However, even this lag may be eliminated by coupling shafts 86, 87 directly to shafts 38 and 49 as shown in Fig. 1B. The operation of the output of follow-up 73, 74, however, may be subjected to a cumulative lag caused by the necessarily successive and non-concurrent operations of torque motors 48, 56, gyro 14, servo and follow-ups 73, 74, which, in some instances, may cause appreciable lag in the setting of shafts 58, 59 in response to actuation of tracking control member 32. By means of the system of Fig. 2, the effect of this lag is greatly minimized, since shafts 58, 59 are mainly actuated directly and substantially instantaneously by means of shafts 86, 87 and variable speed drives 109, 99 without the lag described above. Actually, the data input setting may lead or anticipate the motion of the sighting device orientation in "getting on" the target, so that the computer and guns will be properly set as soon as the correct tracking condition is shown by indicator 6.

If desired, however, variable speed drives 99 and 109 may be rendered inoperative also during remote manual tracking by means of clutches 116 or by stopping constant speed motor 102, in which case the operation of the system becomes substantially the same as that shown in Fig. 1B, since the output cylinders 103, 113 of variable speed drives 109, 99 are thereby immobilized, and the outputs of differentials 104, 114 correspond exactly to the displacements of shafts 86, 87. Even in this case shafts 86, 87 provide a lag corrective component since they provide a component of control for shafts 58, 59 substantially instantaneously responsive to the action of manual tracking control member 32, as described with respect to Fig. 1B. By a suitable choice of proportions and values of the components of the system, this anticipating control component may be made to effectively overcome the inherent lag of the cascaded controls of gyro 14, sighting device 2 and follow-ups 73, 74 described above.

A slewing control may be provided in the system of Fig. 2 similar to that described with respect to Fig. 1B.

Instead of using variable speed drives such as 99, 109 for producing the desired rate component of control for the line of sight during local tracking, the same rate signal derived from tracking control 31 may itself be used. Thus, referring to Fig. 3 there is shown a further modification of Figs. 1B and 2, also adapted to cooperate with Fig. 1A. During local tracking, with switches 119, 120 in the local position L, follow-ups 73, 74 are actuated from the differences between the elevation and azimuth rate signals produced by tracking control 31 and the voltages derived from speed generators 117, 118 driven from the output shafts of follow-ups 73, 74. Speed generators 117, 118 are each adapted to produce a voltage which varies linearly with the speed at which it is driven and hence, is proportional to the speed of the output of its respective follow-up 73, 74.

The voltage outputs of generators 117, 118 are connected in series opposition to the respective signal voltages and the differences between these pairs of voltages serve to control the respective follow-up devices 73, 74. Preferably, each of the follow-up devices 73, 74 is adapted produce a full speed output for a voltage input which [is] small in comparison to the normal range of voltages [de]rived from the tracking control 31 or from speed generators 117, 118.

Accordingly, if the output speed of follow-up 73 or [74] is smaller than that corresponding to the respective [ra]te signal voltage, the voltage output of generator 117 [or] 118 will be less than this signal voltage, leaving a large [di]fference voltage which serves to speed up the follow-up [de]vice 73 or 74 until the signal voltage is substantially [ba]lanced out by the output of speed generator 117 or [11]8. In this way, speed generators 117, 118 provide a [ty]pe of speed reference for follow-ups 73, 74, which will [op]erate under these conditions at speeds substantially [pr]oportional to the corresponding rate signal voltages [pr]ovided by the output of tracking control 31. Such [va]riable speed devices are described more in detail with [re]spect to Figs. 9–12 of copending application Serial [N]o. 428,030, for Positional Control Systems, filed January 24, 1942 in the name of H. L. Hull et al, now [Pa]tent No. 2,526,665.

The component proportional to the displacement of [co]ntrol 32 required to produce aided tracking during [loc]al tracking is provided by shafts 86, 87 driven from [th]e outputs 61, 62 of rate follow-ups 81, 82 in a manner [si]milar to that described in Fig. 2. Alternatively, shafts [86], 87 may be actuated in the manner described in [Fi]g. 1B.

During local tracking operations also, the rate signal [vo]ltage produced in tracking control 31 are preferably [dir]ectly fed to the rate follow-up devices 81 and 82 by [wa]y of switch 107 as described with respect to Fig. 2 [an]d are disconnected from switch 46, whereby the gyro [an]d remote sighting device are rendered ineffective.

During remote tracking operations, when switches 119, [12]0 are in the remote position R, follow-ups 73, 74 are [ac]tuated from the remote sighting device 2 in the manner [alr]eady described, and shafts 86, 87 have substantially [no] effect except to overcome lag.

It will be noted that in each of the systems thus far [de]scribed aided tracking is obtained only during local [tra]cking operations. However, it is also desirable to use [ai]ded tracking during manual remote tracking opera[tio]ns, for the reasons already discussed. Considering [a] system of any of the preceding figures, and confining [att]ention for the moment to control along one coordi[na]te only, such as elevation, it will be seen that a predetermined displacement of manual tracking control mem[be]r 32 produces (in a linear system, which is the preferred [em]bodiment of the invention) a proportional signal volt[ag]e by means of potentiometer 43, which signal gener[at]es a proportional torque by means of torque motor [48], which, in turn, produces a proportional angular ve[loc]ity, or rate of precession (in elevation) of spin axis [20] of gyro 14, thus providing a pure rate type of control [of] spin axis 20.

To modify this system to provide an aided tracking [typ]e of control, it is necessary to add a component of [dis]placement of the orientation of spin axis 20 propor[tio]nal to the control displacement of manual tracking control member 32. From the consideration that the output [dis]placement of spin axis 20 is proportional to the time [int]egral of the control displacement of manual tracking [co]ntrol member 32, it follows that to obtain an output [dis]placement component of spin axis 20 proportional [to] the control displacement of manual control member [32], it will be necessary to control torque motor 48 in [ac]cordance with a signal component proportional to the [tim]e derivative of the signal produced by manual track[ing] control 31.

During constant angular velocity of tracking, it will be [cle]ar that the control displacement will be constant, and [wil]l have zero rate of change or time derivative. Ac[cor]dingly, during such conditions the added control sig[nal] component just discussed will be ineffective, and spin axis 20 will precess at a rate proportional to the control displacement, as is desired. Should it be necessary to change this rate of precession, the control displacement will be changed. During the interval during which the control displacement is changing, a rate of change component will be introduced into the control of torque motor 48, which will momentarily cause a greater rate of precession of the spin axis than would be obtained by the pure rate type of control. This increase in rate of precession, however, is only momentary, during the time that the control displacement is changing, and accordingly causes the spin axis, in effect, to momentarily accelerate with respect to its rate during pure rate control, which momentary acceleration, after the control displacement has stopped changing, produces a net proportional lead of the orientation of the spin axis over what would have been produced by a pure rate control. This is exactly what is termed aided tracking.

Such a component of control proportional to the rate of change of the control displacement may be provided in several ways. One method is to couple a suitable voltage generator to each of the shafts 49 and 38 of tracking control 31. If these generators produce voltages proportional to the rate at which they are actuated, it will be seen that their outputs will be proportional to the desired time derivatives of the control displacement. These generator voltages may then be connected respectively in series with the outputs of potentiometers 43 and 52 representing the rate controls signals, and the combined voltage may then be applied to the torque motors 48 and 56 to give the desired aided tracking.

An alternative method, however, and one which is preferable, is to obtain these rate of change components by electrical circuits without rotating equipment, as in amplifiers 54 and 47. A suitable amplifier for this purpose is shown in Fig. 5. Thus, here the control signal voltage produced, for example, by potentiometer 43, is applied to input terminals 137. Connected in series across terminals 137 are grid input resistors 138 and 139 whose junction 141 is connected through a grid bias battery 142 to the cathodes 143 and 144 of a pair of amplifier tubes 146 and 147, whose grids 148 and 149 are connected directly to terminals 137. The plates 151 and 152 of amplifier tubes 146 and 147 are connected through respective load resistors 153 and 154 to the positive terminal of a source of plate voltage, such as a battery 156, whose negative terminal is connected directly to cathodes 143 and 144.

The voltage of bias battery 142 is adjusted so that the zero signal voltage drops across load resistors 153 and 154 will each have a value corresponding to the average of the extreme values produced by the extreme variations of the control signal voltage applied to terminals 137. The circuits of tubes 146 and 147 are so designed that for zero voltage input to the terminals 137, the volt drops across load resistors 153 and 154 will be equal and opposite.

Accordingly, for a control voltage of one polarity applied to terminals 137, the voltage across one of the resistors 153, 154 will decrease while that across the other will increase, providing a net differential voltage proportional to the input voltage. For an input voltage to terminals 137 of opposite polarity, it will be clear that the other of resistors 153, 154 will produce decreased voltage and the first will produce increased voltage, providing a net differential voltage of opposite polarity. Tubes 146, 147, therefore, serve as a direct current amplifier for the input signal applied to terminals 137, irrespective of the polarity of this signal.

This voltage across load resistor 153 is applied to the series differentiating circuit comprising resistor 157 and condenser 158. By making the capacitance of condenser 158 large and the resistance of resistor 157 small, so that a small time constant is produced, it will be clear that the current passing through condenser 158 and resistor 157 will be substantially proportional to the rate of change or time derivative of the voltage across resistance 153.

Accordingly, the voltage drop across resistor 157 will be proportional to the rate of change of the control signal and hence of the control displacement. In order to add a voltage directly proportional to the control displacement to this derivative voltage, condenser 158 is bypassed by suitable resistor 159. Resistors 157 and 159 provide in effect a voltage divider across resistance 153, whereby an additional component of current will flow through resistor 157 and will produce therein a component volt drop directly proportional to the voltage across resistance 153 as desired.

One terminal of resistor 157 is connected to the grid 161 of an amplifier tube 162 whose cathode is connected through a grid biasing battery 164 to the other terminal of resistor 157, whereby this combined control and rate of change voltage is applied to the input circuit of tube 162. An exactly similar differentiating circuit comprising condenser 166 in series with resistor 167 across resistor 154 and shunted by a resistor 168 is provided for a second amplifier tube 169 connected in similar fashion. The outputs of tubes 162 and 169 are fed directly to the torque motor 48, which in this instance is indicated as being of the type comprising two opposed energizing windings 171 and 172, whose junction 173 is connected to the cathodes 174 and 162 of tubes 169 and 162 through plate voltage source 176, the opposite terminals of coils 171 and 172 being directly connected to the respective plates 177 and 178 of tubes 162 and 169.

Bias source 164 is so selected that for zero input voltage to terminals 137, currents will flow in coils 171 and 172 of torque motor 48 producing equal and opposite effect whereby a net zero output torque is obtained. For a predetermined rate, the circuit of Fig. 6 will then produce differentially varying currents in the coils 171 and 172 proportional to a combination of the input voltage and its rate of change, whereby an output torque from torque motor 48 is derived proportional to the control signal and its rate of change and therefore proportional to a combination of the control displacement and its rate of change.

As discussed above, this torque will produce a precession of the spin axis 20 of gyro 14 having a rate proportional to the control displacement and also having a component of displacement of axis 20 proportional to the control displacement, thus producing aided tracking of the line of sight defined by spin axis 20.

Conditions of varying rate of the line of sight will usually occur when the tracking operator is trying to "get on" the target. During this period, of course, the remotely controlled guns will not be used, since they will not be correctly aimed. Accordingly, it is immaterial whether the rate data inputs 61, 62 are correctly actuated at this time. Hence the rate follow-up devices 81, 82 may still be connected, as shown in Fig. 1A, to the tracking control 31. However, if it is desirable that the rate data be correct at all times, it is then necessary to connect these rate follow-up devices 81, 82 directly to the inputs to torque motors 48, 56. Such will be necessary when the operator maintains tracking during changing angular velocities of the target.

The use of differentiating amplifiers 47' is also desirable during automatic tracking under the control of the radio scanner 2 and radio receiver 4, since the added derivative component then provides an anticipating effect in the control of the gyro spin axis orientation, which assists in maintaining effective tracking with fast moving and variable velocity targets.

It is also desirable to provide means for slewing the gyro line of sight during manual remote tracking. Such a device is also shown in Fig. 5. Thus, a cam arrangement similar in all respects to that described in Fig. 4 is provided, comprising a cam 91' fixed to shaft 38, which at one extreme of displacement of manual control member 32 effectively short-circuits coil 171 to provide a maximum output torque and therefore a maximum rate of precession of spin axis 20 of gyro 14, and which, for an opposite extreme displacement of manual control member 32, short-circuits the other coil 172 to provide an opposite maximum torque, again providing slewing of the gyro spin axis 20 but in the opposite sense.

Separate cams 91 and 91' may be used for controlling slewing during local and manual remote tracking operations or preferably a single cam may be used which simultaneously serves to short-circuit one coil of torque motor 48 and the corresponding coil of motor 133. It will be seen that this may easily be done, since during local unstabilized tracking operations gyro 14 is ineffective and the torques applied to it have no bearing upon the functioning of the system. During manual remote tracking or local stabilized tracking, it is desirable to slew both the gyro spin axis and the follow-up motor 133 in order that both the line of sight defined by the gyro spin axis and the computing mechanism setting may be simultaneously changed at the high slewing rate. However, during slewing of the gyro spin axis 20, it is not absolutely necessary to provide slewing control of motor 133, since motor 133 will be controlled by signal generator 68 to follow the orientation of the gyro spin axis. It is desirable, however, to employ simultaneous slewing of the gyro spin axis and motor 133, especially where the slewing rate is much higher than the maximum rate of control which signal generator 68 and amplifier 126 may provide for motor 133, which is the desirable situation.

Accordingly, the device of the present invention provides an improved stabilized tracking and fire control system having aided tracking manual control as well as automatic control, and provided with slewing devices, whereby the effective utility of such systems is greatly enhanced.

It is to be understood that any suitable type of antihunt and anti-lag devices may be incorporated in any of the servo or follow-up devices of the present invention.

By the term "sighting device" as used in the present specification and claims is meant any device having a variable orientation along whose direction the presence of a distant object can be indicated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A stabilized fire control system for deriving data for properly aiming a gun to engage a fast moving target, comprising a remote sighting device defining a line of sight, a free gyro, means responsive to movements of said gyro for controlling said sighting device, a manual tracking control member, means for producing a signal by and proportional to displacement of said member, means controlled by said signal for precessing said gyro at a rate proportional to said signal, a target orientation data device and a target orientation rate data device adapted to supply target orientation and rate data to a computer for deriving gun aiming data when said orientation and orientation rate devices are actuated by data corresponding to the present orientation and angular velocity of a target, means for controlling said orientation data device in synchronism with said sighting device, whereby data corresponding to the orientation of said line of sight is set into said orientation data device, means for controlling said rate data device by said signal, whereby said rate data device is set in accordance with said target velocity, a local sighting device coupled directly to said orientation data device to be actuated simultaneously therewith, and means for additionally displacing said local sighting device and said orientation data device by and in proportion to the displacement of said control member, whereby aided tracking is produced during tracking by means of said local sighting device.

2. A fire control system for deriving data for properly aiming a gun to engage a fast moving target, comprising a remote sighting device defining a line of sight, a manual tracking control member, means for producing a signal by and proportional to the displacement of said control member, means for producing an angular velocity of said sighting device and line of sight proportional to said signal, a target orientation data device and a target rate data device adapted to supply target orientation and rate data to a computer for deriving gun aiming data when said devices are actuated by data corresponding to the present orientation and angular velocity of a target, means for controlling said orientation data device in synchronism with said sighting device, whereby data corresponding to the orientation of said line of sight is set into said orientation data device, means for controlling said rate data device by said signal, whereby said rate data device is set in accordance with said target velocity, a local sighting device coupled directly to said orientation data device to be actuated simultaneously therewith, and means additionally displacing said local sighting device and said orientation data device by and in proportion to the displacement of said control member, whereby aided tracking is produced during tracking by said local sighting device.

3. A fire control system for deriving data for properly aiming a gun to engage a fast moving target, comprising a first sighting device defining a line of sight, a manual tracking control member, means responsive to said control member for controlling the orientation of said sighting device and line of sight by controlling the rate of movement thereof, means for setting a computing mechanism in synchronism with said sighting device, a second sighting device positioned by said setting means in synchronism with said first sighting device, and means responsive to the position of said control member for additionally displacing said second sighting device and the setting of said computing mechanism in accordance with the rate of turn of said first sighting device, whereby aided tracking is produced during tracking by said second sighting device.

4. A fire control system as in claim 3, wherein said additional displacing means comprises a variable speed drive, means for controlling the output speed of said drive by said control member, and means for displacing said second sighting device in accordance with said output and in accordance with said displacement of said control member.

5. Stabilized fire control apparatus comprising a target position data device and a target rate data device adapted to supply target position and rate data to a computer for determining correct gun aiming angles for engaging a target when said devices are actuated in accordance with the present position and velocity of a target, a free gyroscope, a tracking control member, torque creating means for producing a torque corresponding to the displacement of said control member, means for precessing the spin axis of said gyro to track with a target at a rate proportional to said torque, a sighting device, means for controlling the orientation of said sighting device by the orientation of said spin axis, means for controlling said position data device from the orientation of said sighting device, means for controlling said rate data device in accordance with said displacement of said control member, and means for additionally displacing said position data device by and in proportion to the displacement of said control member, whereby the effect of lag in said position data device controlling means is substantially overcome.

6. Stabilized fire control apparatus comprising a target position data device and a target rate data device adapted to supply target position and rate data to a computer for determining correct gun aiming angles for engaging a target when said devices are actuated in accordance with the present position and velocity of said target, a free gyroscope, a tracking control member, torque creating means for producing a torque corresponding to displacement of said control member, means responsive to said torque creating means for precessing the spin axis of said gyro to track with a target at a rate proportional to said torque, means for controlling said position data device from the orientation of said spin axis, means for controlling said rate data device in accordance with said displacement, and means for additionally displacing said position data device by and in proportion to the displacement of said control member, whereby the effect of lag in said position data device controlling means is substantially overcome.

7. Fire control apparatus comprising a target position data device adapted to supply target position data to a computer for determining correct gun aiming angles for engaging a target when said device is actuated in accordance with the present position of said target, a sighting device defining a line of sight, a tracking control member, means responsive to displacement of said control member for causing said line to track with a target at a rate proportional to said displacement, means for controlling said position data device from the orientation of said line of sight, and means for additionally displacing said position data input device by and in proportion to the displacement of said control member, whereby the effect of lag in said tracking and controlling means is substantially overcome.

8. Fire control apparatus as in claim 7, further including means for additionally controlling said position data device by and at a rate corresponding to said displacement of said control member.

9. A fire control apparatus comprising a device for supplying target position data to a computing mechanism for determining correct gun aiming angles for engaging a target, a free gyro, means including a tracking control member for precessing the spin axis of said gyro to track with a target, means introducing the angular position of said spin axis into said device, and means for additionally displacing said device by and in proportion to the displacement of said control member to overcome lag in said controlling and precessing means.

10. Fire control apparatus comprising an input device for supplying target position data to a computing mechanism for determining correct aiming angles for engaging a target, a stabilizer, a sighting device having a line of sight controlled by said stabilizer, means including a tracking control member for causing said line of sight to track with a target, means for controlling said input device from said sighting device, and means for additionally displacing said input device by and in proportion to the displacement of said control member to overcome lag in said controlling and tracking means.

11. A fire control system for deriving data for properly aiming a gun to engage a fast moving target, comprising a first sighting device defining a line of sight, a manual tracking control member, means for producing an angular velocity of said sighting device and line of sight by and corresponding to the displacement of said control member, a target orientation data device for supplying data to a computing mechanism for deriving said gun aiming data, means for controlling said orientation data device in synchronism with said sighting device, whereby, when said sighting device is tracking with a target, data corresponding to said target orientation is set into said computing mechanism, a second sighting device coupled to said orientation data device to be actuated simultaneously therewith, the normal rates of said data input controlling means and said second sighting device being controlled to increase with increased displacement of said control member, and normally inoperative means controlled by said control member and rendered operative thereby only upon substantially maximum displacement of said member to modify said data input controlling means by causing it to slew said second sighting device at a substantially instantaneously and greatly increased rate above the range of said normal rates.

12. A stabilized tracking control system for positioning an output member in accordance with the orientation of a fast moving target, comprising a remote sighting device defining a line of sight, a free gyroscope, means for controlling said sighting device from said gyro, a manual tracking control member, means for producing a signal by and proportional to the displacement of said member, means for precessing said gyro by and at a rate proportional to said signal, means for controlling said output member in synchronism with said sighting device whereby said member is set in accordance with the target orientation, a local sighting device coupled directly to said output member to be actuated simultaneously therewith, and means for additionally displacing said local sighting device and said output member by and in proportion to the displacement of said control member, whereby aided tracking is produced during tracking by means of said local sighting device.

13. An aided tracking control system for positioning an output member in accordance with the orientation of a fast moving target, comprising a remote sighting device defining a line of sight, a manual tracking control member, means for producing a signal by and proportional to the displacement of said control member, means actuated by said signal producing means for rotating said sighting device and line of sight at an angular velocity by and proportional to said signal, means for controlling said output member in synchronism with said sighting device whereby said member is set in accordance with the orientation of said line of sight, a local sighting device coupled directly to said output member to be actuated simultaneously therewith, and means additionally displacing said local sighting device and said output member by and in proportion to the displacement of said control member, whereby aided tracking is produced during tracking by said local sighting device.

14. A target tracking system comprising a first sighting device defining a line of sight, a manual tracking control member, means for controlling the orientation of said line of sight by said control member, a second sighting device defining a second line of sight, means for controlling said second sighting device in synchronism with said first sighting device to be actuated simultaneously therewith, and means additionally controlling said second sighting device in accordance with the rate of turn of said first sighting device, whereby, during tracking by said first sighting device a rate tracking control system is obtained, and during tracking by said second sighting device an aided tracking system is obtained.

15. A tracking control system as in claim 14 wherein said additional controlling means comprises a variable speed drive, means for controlling the output speed of said drive by said control member, and means for displacing said second sighting device in accordance with said output and in correspondence with said displacement of said control member.

16. A stabilized aided tracking control system for positioning an output member in accordance with the orientation of a fast moving target, comprising a sighting device defining a line of sight, a free gyroscope, means for controlling the orientation of said line of sight by said gyro, a manual tracking control member, means for producing a control signal by and proportional to the displacement of said member, means for precessing the spin axis of said gyro at a rate proportional to said control signal, means for controlling said output member by said sighting device whereby said member is set in correspondence with the orientation of said line of sight, and means responsive to the rate of displacement of said tracking control member for modifying said control signal in accordance with the rate of change thereof in a manner such that said sight is controlled according to the displacement and rate of change of displacement of said control member.

17. A stabilized aided tracking control system for positioning an output member in accordance with the orientation of a fast moving target, comprising a free gyroscope, a manual tracking control member, means for producing a control signal by and proportional to the displacement of said member, means connected to said control signal producing means for producing a rate signal corresponding to the rate of change of said control signal, means for combining said signals, means for precessing the spin axis of said gyro by and at a rate proportional to said combined signals, and means for controlling said output member in synchronism with said spin axis, whereby said output member is set in accordance with the orientation of said spin axis and an aided tracking control system is obtained.

18. A stabilized aided tracking control system for positioning an output member in accordance with the orientation of a fast moving target, comprising a free gyroscope, a manual tracking control member for producing a control signal proportional to displacement thereof, means actuated by said control signal for producing a composite signal including the combination of said control signal and a rate signal dependent upon the rate of change of said control signal, means for precessing the spin axis of said gyro by said composite signal at a rate corresponding to the displacement and the rate of change of displacement of said control member, and means for controlling said output member in synchronism with said spin axis, whereby said output member is set in accordance with the orientation of said spin axis and an aided tracking control system is obtained.

19. An aided tracking control system for positioning an output member in accordance with the orientation of a fast moving target, comprising a sighting device defining a line of sight, a manual tracking control member, means for producing a control signal by and proportional to displacement of said control member, means connected to said signal producing means for producing a rate signal corresponding to rate of change of said control signal, means for combining said control and rate signals to produce a composite signal, means for rotating said line of sight and sighting device at an angular velocity proportional to said composite signal, and means for controlling said output member in synchronism with said sighting device, whereby said output member is set in accordance with the orientation of said line of sight and an aided control system is obtained.

20. An aided tracking control system for positioning an output member in accordance with the orientation of a fast moving target, comprising a sighting device defining a line of sight, a manual tracking control member for producing a control signal corresponding to the displacement thereof, means actuated by said control signal for producing a composite signal including the combination of said control signal and a rate signal dependent upon the rate of change of said control signal, mechanism actuated by said composite signal for controlling the orientation of said line of sight at a rate corresponding to the displacement and the rate of change of displacement of said control member, and means for controlling said output member in synchronism with said sighting device, whereby said output member is set in correspondence with the orientation of said line of sight and an aided tracking control system is obtained.

21. A tracking control system comprising a first sighting device defining a line of sight, a manual tracking control member, means for controlling the orientation of said sighting device and line of sight by said control member, an output member, means for controlling said member in synchronism with said sighting device, whereby when said sighting device is tracking with a target said output member is set in correspondence with said target orientation, a second sighting device coupled to said output member to be actuated simultaneously therewith, the normal rates of said second sighting device being controlled to increase with increased displacement of said control member, and normally inoperative means controlled by said control member and rendered operative thereby only upon substantially maximum displacement of said member for operating said control means in a manner to slew said second sighting device at a substantially instantaneously and greatly increased rate above the range of said normal rates.

22. A stabilized fire control system for deriving data for properly aiming a gun to engage a fast moving target, comprising a free gyro, a manual tracking control member, means for precessing the spin axis of said gyro under the control of said control member to track with a target, a sighting device controlled by said gyro, the normal rates of said sight being controlled to increase with increased displacement of said control member, and a normally inoperative means controlled by said control member and rendered operative thereby only upon substantially maximum displacement of said member for operating said precessing means in a manner to cause slewing of said sighting device at a substantially instantaneously and greatly increased rate above the range of said normal rates.

23. A stabilized tracking control system comprising a free gyroscope, a manual tracking control member, torque creating means for producing a torque corresponding to the displacement of said control member, means for precessing the spin axis of said gyro to track with a target at a rate corresponding to said torque, the normal torques produced by said torque-creating means being controlled to increase with increased displacement of said control member, and normally inoperative means controlled by said control member and rendered operative thereby only upon substantially maximum displacement of said member to cause said torque-creating means to produce a torque of substantially instantaneously and greatly increased magnitude above the range of said normal torques whereby to slew said spin axis at a greatly increased rate.

24. A stabilized tracking control system comprising a free gyroscope, a tracking control member, means for precessing the spin axis of said gyroscope to track with a target under the control of said control member, the normal rates of precession of said gyroscope being controlled to increase with increased displacement of said control member, and normally inoperative means controlled by said control means and rendered operative thereby only upon substantially maximum displacement of said member for operating said precessing means to slew said spin axis of the gyroscope at a substantially instantaneously and greatly increased rate above the range of rates produced by normal precession rates.

25. An automatic stabilized fire control system comprising a radio sighting device defining a line of sight and including a receiver, a free gyro, means for controlling the orientation of said sighting device from said gyro, a target orientation device for supplying data to a computing mechanism for deriving correct gun aiming angles for engaging a fast-moving target, means for controlling said orientation device from said sighting device, automatic means cooperable with said receiver for deriving a signal proportional to the relative displacement between said line of sight and the orientation of a target, and means connected to said automatic means for precessing said gyro at a rate proportional to said signal and the rate of change thereof for causing said sighting device to move in a direction to reduce said signal to zero, whereby said line of sight is automatically maintained oriented toward said target and said gun aiming angles are automatically derived.

26. An automatic fire control system comprising a radio sighting device defining a line of sight and including a receiver, a target orientation device for supplying data to a computing mechanism for deriving correct gun aiming angles for engaging a fast-moving target, means for controlling said orientation device from said sighting device, automatic means cooperable with said receiver for deriving a signal corresponding to the relative displacement between said line of sight and the orientation of a target, and means connected to said automatic means for controlling the orientation of said sighting device at a rate corresponding to said signal and the rate of change thereof for causing said sighting device to move in a direction to reduce said signal to zero in a manner such that said sighting device is automatically maintained oriented toward said target and said gun aiming angles are automatically derived.

27. An automatic stabilized tracking system comprising a radio sighting device defining a line of sight and including a receiver, a free gyro, means for controlling the orientation of said sighting device from said gyro, automatic means cooperable with said receiver for deriving a signal corresponding to the relative displacement between said line of sight and the orientation of a target, and means connected to said automatic means for precesisng said gyro at a rate proportional to said signal and the rate of change thereof for causing said sighting device to move in a direction to reduce said signal to zero in a manner such that said sighting device is automatically maintained oriented toward said target.

28. An automatic tracking system comprising a radio sighting device defining a line of sight and including a receiver, automatic means cooperable with said receiver for deriving a signal corresponding to the relative displacement between said line of sight and the orientation of the target, and means connected to said automatic means for controlling the angular velocity of said line of sight in accordance with said signal and the rate of change thereof in a manner such that said line of sight is automatically maintained oriented toward said target.

29. A stabilized aided tracking system comprising a free gyro, a control device for producing a control signal corresponding to a desired rate of precession of said gyro, means connected to said control device to be actuated by said control signal for producing a composite signal including the combination of said control signal and a rate signal dependent upon the rate of change of said control signal, and a torque applying device connected to said means to be actuated by and according to said composite signal for causing said gyro to precess at a rate determined by said control signal and the rate of change thereof.

30. A stabilized aided tracking system comprising a free gyro, a sighting device positioned by said gyro for stabilizing the line of sight therefrom, a control device for producing a control signal corresponding to a desired rate of rotation of said line of sight, means connected to said control device to be actuated by said control signal for producing a composite signal including the combination of said control signal and a rate signal dependent upon the rate of change of said control signal, and a torque applying device connected to said means to be actuated by and according to said composite signal for causing said gyro to precess at a rate determined by said control signal and the rate of change thereof to turn said sighting device at a corresponding rate.

31. An aided tracking system comprising a sighting device, a control device for producing a control signal corresponding to a desired rate of rotation of said sighting device, means connected to said control device to be actuated by said control signal for producing a composite signal including the combination of said control signal and a rate signal dependent upon the rate of change of said control signal, and mechanism actuated by said composite signal for rotating said sighting device at a rate dependent upon said control signal and the rate of change thereof.

32. An automatic tracking system comprising a radiant-energy-responsive sighting device defining a line of sight and including a receiver for receiving said radiant energy and means cooperable with said receiver for producing a control signal corresponding to the relative displacement between said line of sight and the direction to a target, means controlled by said control signal for producing a composite signal including the combination of said control signal and a rate signal dependent upon the rate of change of said control signal, and mechanism actuated by said composite signal for rotating said sighting device to move the line of sight toward the target at a rate dependent upon said displacement and the rate of change thereof.

33. An automatic tracking system comprising a radiant-energy-responsive sighting device defining a line of sight and including a receiver for receiving said radiant energy and means cooperable with said receiver for producing a control signal corresponding to the relative displacement between said line of sight and the direction to a target, a free gyro for positioning said sighting device to stabilize the line of sight therefrom, means controlled by said control signal for producing a composite signal including the combination of said control signal and a rate signal dependent upon the rate of change of said control signal, and a torque applying device connected to said means to be actuated by and according to said composite signal for causing said gyro to precess at a rate dependent upon said displacement and the rate of change thereof, whereby said line of sight will follow said gyro to move toward the target at a corresponding rate.

34. An automatic tracking system comprising a radio sighting device defining a line of sight and including a receiver for receiving the radio energy and means cooperable with said receiver for producing a signal corresponding to the relative displacement between said line of sight and the direction to a target, means for producing a rate signal corresponding to the rate of change of said control signal, means for combining said control and rate signals to produce a composite signal, and mechanism actuated by said composite signal for rotating said sighting device to move the line of sight toward the target at a rate dependent upon said displacement and the rate of change thereof.

35. An automatic tracking system comprising a radio sighting device defining a line of sight and including a receiver for receiving the radio energy and means cooperable with said receiver for producing a control signal corresponding to the relative displacement between said line of sight and the direction to a target, a free gyro for positioning said sighting device to stabilize the same, means for producing a rate signal corresponding to the rate of change of said control signal, means for combining said control and rate signals to produce a composite signal including the combination of said control signal and a rate signal dependent upon the rate of change of said control signal, and a torque applying device connected to said combining means to be actuated by and according to said composite signal for causing said gyro to precess at a rate dependent upon said displacement and the rate of change thereof, whereby said line of sight will follow said gyro to move toward the target at a corresponding rate.

References Cited in the file of this patent

UNITED STATES PATENTS

| | | |
|---|---|---|
| 1,031,769 | Barr et al. | July 9, 1912 |
| 1,345,697 | Routin | July 6, 1920 |
| 1,390,471 | Sundhaussen | Sept. 13, 1921 |
| 1,849,611 | Bussei | Mar. 15, 1932 |
| 2,071,424 | Papello | Feb. 23, 1937 |
| 2,405,068 | Tear et al. | July 30, 1946 |
| 2,407,191 | Tear et al. | Sept. 3, 1946 |
| 2,437,463 | Ford | Mar. 9, 1948 |
| 2,658,277 | Davis et al. | Nov. 10, 1953 |
| 2,660,793 | Holschuh et al. | Dec. 1, 1953 |

FOREIGN PATENTS

| | | |
|---|---|---|
| 616,248 | Germany | Aug. 1, 1935 |
| 657,552 | Germany | Mar. 7, 1938 |